United States Patent

(12) United States Patent
Salmond et al.

(10) Patent No.: US 9,768,461 B2
(45) Date of Patent: Sep. 19, 2017

(54) RENEWAL ENERGY POWER GENERATION SYSTEM

(71) Applicant: ELECTRYGEN PTY LTD, Beerwah, Queensland (AU)

(72) Inventors: Colin Salmond, Beerwah (AU); Grant Salmond, Mt Isa (AU)

(73) Assignee: ELECTRYGEN PTY LTD, Queensland (AU)

( * ) Notice: Subject to any disclaimer, the term of this patent is extended or adjusted under 35 U.S.C. 154(b) by 192 days.

(21) Appl. No.: 14/365,807

(22) PCT Filed: Dec. 14, 2012

(86) PCT No.: PCT/AU2012/001535
§ 371 (c)(1),
(2) Date: Jun. 16, 2014

(87) PCT Pub. No.: WO2013/086579
PCT Pub. Date: Jun. 20, 2013

(65) Prior Publication Data
US 2014/0306645 A1    Oct. 16, 2014

(30) Foreign Application Priority Data

Dec. 14, 2011 (AU) ................. 2011905209

(51) Int. Cl.
*H02J 7/00* (2006.01)
*H01M 8/0656* (2016.01)
*B63H 21/00* (2006.01)
*F17C 11/00* (2006.01)
*H02J 7/34* (2006.01)
*H02S 10/10* (2014.01)
*H01M 8/04082* (2016.01)

(52) U.S. Cl.
CPC .......... *H01M 8/0656* (2013.01); *B63H 21/00* (2013.01); *F17C 11/005* (2013.01);
(Continued)

(58) Field of Classification Search
None
See application file for complete search history.

(56) References Cited

U.S. PATENT DOCUMENTS 5,592,028 A    1/1997  Pritchard
7,036,314 B2 *  5/2006  Hoffjann ................ B64D 11/02
                                                              429/425
(Continued)

FOREIGN PATENT DOCUMENTS

WO    2010/133684    11/2010

OTHER PUBLICATIONS

International Search Report for PCT/AU2012/001535 dated Feb. 5, 2013.

*Primary Examiner* — Leigh Garbowski
(74) *Attorney, Agent, or Firm* — Young & Thompson

(57) ABSTRACT

Provided is a renewable energy power generation system (10) having a renewable energy power generating apparatus (12) arranged to generate electric power; and a hydrogen power generation module (20) having a separation unit (22) adapted to separate water into hydrogen and oxygen, and a fuel cell unit (28) adapted to receive air or oxygen, and hydrogen from said separation unit or from a hydrogen storage; the fuel cell unit being arranged to produce electric power in the presence of hydrogen and oxygen; wherein the hydrogen power generation module being adapted to receive electric power from the at least one renewable energy power generating apparatus at least prior to production of electric power by the fuel cell unit.

5 Claims, 3 Drawing Sheets

(52) U.S. Cl.
CPC ............ *H02J 7/0052* (2013.01); *H02J 7/345* (2013.01); *H02S 10/10* (2014.12); *B63H 2021/003* (2013.01); *F05B 2220/61* (2013.01); *H01M 8/04208* (2013.01); *H01M 8/04216* (2013.01); *H01M 2250/10* (2013.01); *H01M 2250/20* (2013.01); *H01M 2250/402* (2013.01); *Y02B 90/12* (2013.01); *Y02B 90/14* (2013.01); *Y02E 10/725* (2013.01); *Y02E 70/10* (2013.01); *Y02E 70/20* (2013.01); *Y02P 20/133* (2015.11); *Y02T 70/5209* (2013.01); *Y02T 90/32* (2013.01); *Y02T 90/34* (2013.01); *Y02T 90/38* (2013.01); *Y02T 90/46* (2013.01)

(56) References Cited

U.S. PATENT DOCUMENTS

| | | | |
|---|---|---|---|
| 7,602,073 B2 * | 10/2009 | Meyers | H01M 16/003 290/1 A |
| 7,759,812 B2 * | 7/2010 | Taylor | F03D 3/0409 290/44 |
| 8,749,202 B2 * | 6/2014 | Ishibashi | B60L 11/1809 320/101 |
| 2004/0081861 A1 | 4/2004 | Parchamazad | |
| 2007/0138006 A1 * | 6/2007 | Oakes | B60L 8/00 204/278 |
| 2007/0267874 A1 | 11/2007 | Taylor et al. | |
| 2008/0145724 A1 * | 6/2008 | McCary | H01M 8/04208 429/413 |
| 2008/0241615 A1 * | 10/2008 | Sugimasa | B01J 19/0093 429/424 |
| 2009/0025315 A1 * | 1/2009 | Gutfleisch | H01M 8/04089 52/173.3 |
| 2011/0005473 A1 * | 1/2011 | Ishikawa | B01D 53/0407 123/3 |
| 2011/0040421 A1 | 2/2011 | Duret et al. | |
| 2012/0068661 A1 | 3/2012 | Fracas | |
| 2012/0125029 A1 * | 5/2012 | Moreau | F24D 3/18 62/235.1 |

* cited by examiner

RENEWAL ENERGY POWER GENERATION SYSTEM

TECHNICAL FIELD

THIS INVENTION relates to a renewable energy power generation system, and in particular but not limited thereto, the system is adapted to use at least one renewable energy source and a hydrogen fuel source to provide power for propulsion delivery for both stationary and mobile applications on land, sea and in space.

BACKGROUND

The GDP growth aspirations and expectations of the world population are in collision with peak oil' and man accelerated global warming. These events have resulted from a century of fossil-fuelled greenhouse gas emissions, largely caused by consumption of coal/oil/gas. Sustainable energy is between a rock and a hard place. This impasse is the catalyst to create sustainable, renewable energy fuels from the most abundant free sources, sun, wind, moon, water, earth's plasma. It is desirable to control the harvest, storage and delivery of this abundant/natural/free energy at a relatively low cost per MW in the face of unsustainable fossil-fuelled energy.

Coal, oil and gas fired power stations have historically provided commercial & domestic base load energy from mining earth's fossil reserves. Crude oil/gas products have fuelled the transport industry through the ICE plant (internal combustion engine) which is a highly matured/sophisticated device but low in efficiency, in the order of 20%. World distribution infrastructures of fossil fuel are widespread.

OBJECT OF THE INVENTION

It is an object of the present invention to provide a hydrogen power generation system to alleviate or to at least reduce to a certain level one or more of the prior art disadvantages

SUMMARY OF THE INVENTION

In one aspect therefore the present invention resides in a renewable energy power generation system comprising at least one renewable energy power generating apparatus adapted to generate electric power; and a hydrogen power generation module having a separation unit adapted to separate water into hydrogen and oxygen, and a fuel cell unit adapted to receive air or oxygen, and hydrogen from said separation unit or from a hydrogen storage; the fuel cell unit being arranged to produce electric power in the presence of hydrogen and oxygen; wherein the hydrogen power generation module being adapted to receive electric power from the at least one renewable energy power generating apparatus at least prior to production of electric power by the fuel cell unit.

The at least one renewable energy power generating apparatus may be adapted to use one or a combination of two or more of renewable energy sources to generate electric power. The renewable energy sources may include wind, solar, water, wave, geo-thermal and the like energy sources.

The system may have one or more electric power storage devices adapted to store the electric power from the at least one renewable energy power generating apparatus and the hydrogen power generation module. The storage devices may include batteries and/or capacitors.

The system may have conversion means adapted to covert the electric power to a form suitable for domestic and/or industrial electric appliances and/or equipment.

In preference, the system has a water purification module adapted to provide a relatively pure water from a water source. The water source may be sea water, brackish water, or any water containing part of land such as river or lake or dam.

The system may be adapted to covey a part of the water from the water purification module for use domestically or industrially.

In preference, said fuel cell unit is also adapted to produce water at an elevated temperature. Preferably, the water from the fuel cell unit may be conveyed to an air conditioning system for exchanging heat with a working fluid of the air conditioning system.

Preferably, the system has a water tank adapted to hold water from the water purification module and at least a part of the water from the fuel cell unit, and mineralization means adapted to add appropriate minerals to water from the water tank so as to be potable.

The system according to the present invention may be adapted to control the harvest and delivery of sustainable energy from the sun, PVC & heat, wind, hydro, geothermal steam generation and additionally capture hydrogen energy from water electrolysis, waste and anaerobic sources in order to supply stationary commercial/domestic base load MWs and mobile electric motors/propulsors.

The product hydrogen may be stored in a safe hydrogen storage by cryogenic, metal hydride and chemical hydride means and deliver Hydrogen Fuel Cell efficiencies such as in the order of 85% with maintenance down time of a relatively small magnitude such as one minute in six years, driving down renewable energy MW costs.

The system may also have a controller adapted to control operation of said at least one renewable energy power generating apparatus, and/or the hydrogen power generation module, and/or one or more electric power storage devices, and/or said conversion means.

BRIEF DESCRIPTION OF THE DRAWINGS

In order that the present invention can be readily understood and put into practical effect the description will hereinafter refer to the accompanying drawings which illustrate non limiting embodiments of the present invention and wherein.

DETAILED DESCRIPTION OF THE DRAWINGS

Figure 1:
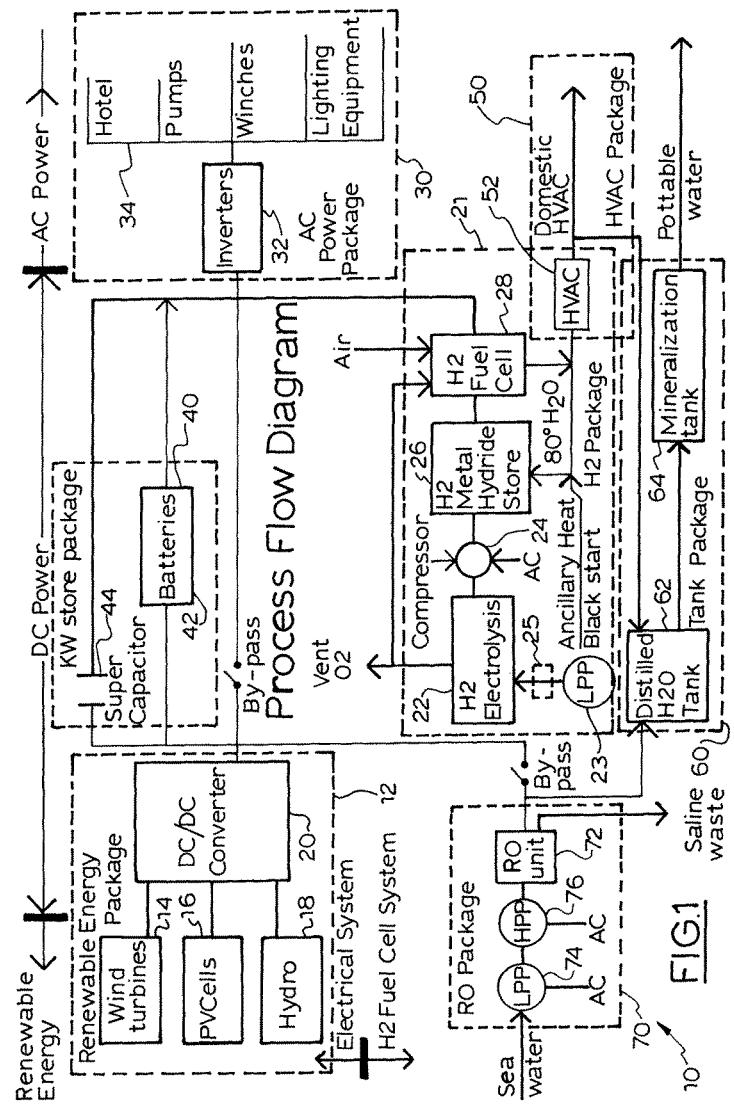
FIG. 1 is a block flow diagram showing main components of an embodiment of the renewable energy hydrogen power generation system according to the present invention.

Referring to the drawings and initially to FIG. 1, there is shown an embodiment of the renewable energy hydrogen power generation system 10 according to the present invention. The system 10 has renewal energy module 12 adapted to generate electrical power from wind turbines 14, solar collectors which in this embodiment are photovoltaic cells 16 and hydro turbines 18. The wind turbines generate electric power at about 48V DC. The photovoltaic cells produce electric power at about 12V DC and the hydro turbines at about 6 to 9V DC. The module 12 uses a DC/DC converter 20 to regulate its output at about 48V DC.

The system 10 also has a hydrogen power generation module 21 having an electrolysis separation unit 22 for separating water ($H_2O$) into hydrogen and oxygen components, a compressor 24 for compressing the hydrogen and feeding it into a metal hydride storage 26, and a hydrogen fuel cell assembly 28 adapted to receive hydrogen from the storage 26. The fuel cell assembly 28 is formed of a stack of fuel cells which facilitate an electrochemical reaction between oxygen and hydrogen to produce electric power and water at an elevated temperature of about 80°. The oxygen is extracted from air that is introduced into the fuel cells.

The DC electric powers from the renewable energy module 12 and the hydrogen power module 21 are controllably supplied to an AC power utility module 30 which uses an inverter 32 to convert the DC power into AC power for operating electric consuming devices 34 such as lighting equipment, winches, pumps, and devices generally available at a hotel. Excess power is fed to a DC power storage module 40 for charging batteries 42 and/or super capacitors 44.

The warm water from the fuel cell assembly 28 is fed into a heating ventilation and air conditioning module (HVAC) 50 having an air conditioning system 52 for conditioning air temperature in a building. A part of the warm water may be diverted into a potable water module 60 for providing potable water. The module 60 has a distilled water tank 62 to which the warm water is delivered and a mineralization tank 64 for adding desired minerals to the water from the tank 62.

The system 10 also has a water purification module 70 for producing desalinated water from sea water. In this embodiment, the module 70 use a reverse osmosis unit 72 for separating saline from sea water. The purified water is fed into the distilled water tank 62 and the saline waste is discarded as a by-product. Low pressure pump 74 is used to draw water from sea and a high pressure pump 76 is used to supply water at a relatively high pressure at the reverse osmosis unit 72.

A low pressure pump 23 in the hydrogen power generation module 20 draws distilled water from the tank 62 and fed it into the separating unit 22 for producing hydrogen gas. A de-ionization unit may be provided for de-ionising the distilled water prior to entering the separating unit 22.

Figure 2:
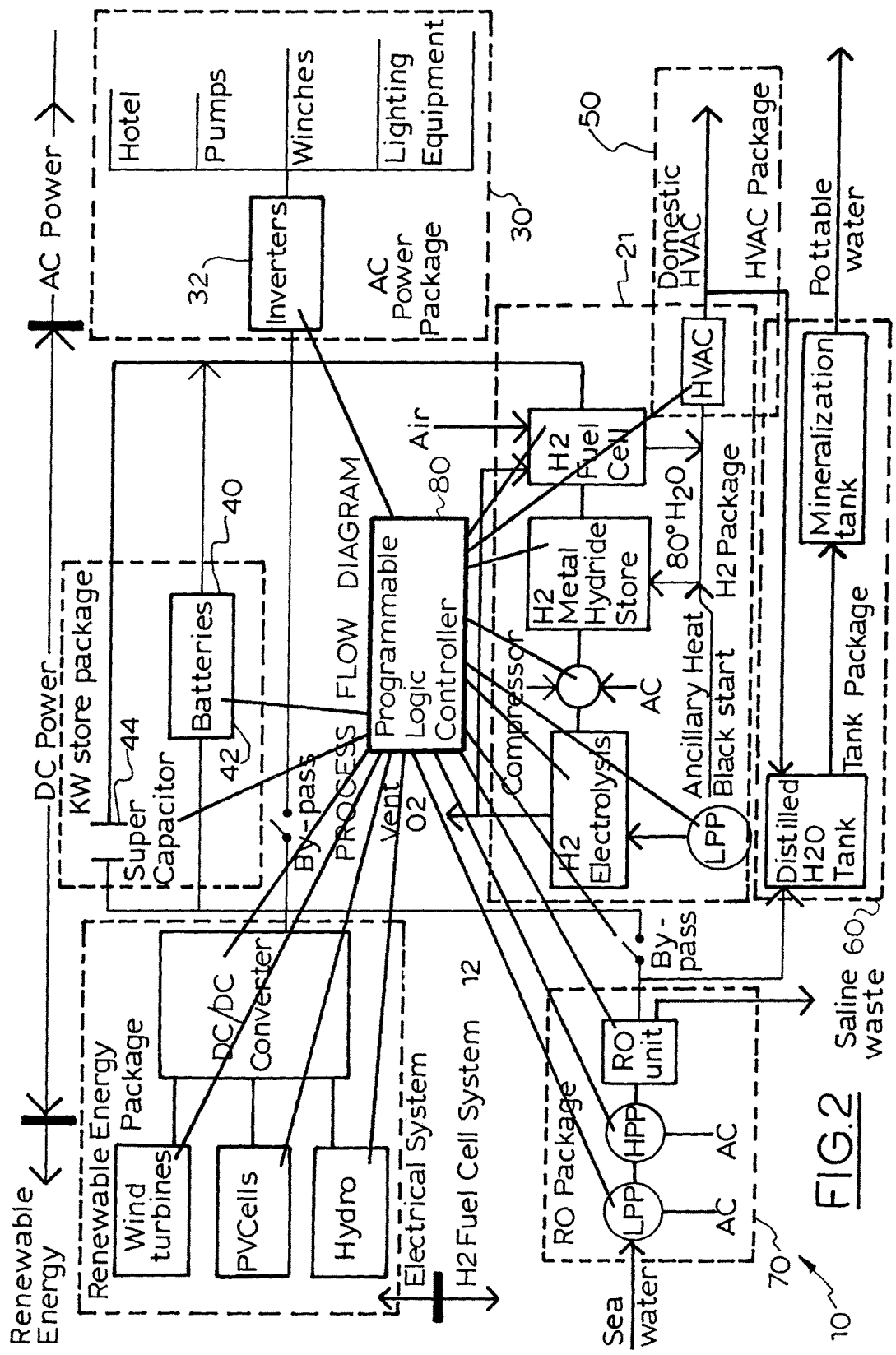
FIG. 2 is a shows a programmable logic controller for controlling the components [15] of the system shown in FIG. 1.

As shown in FIG. 2, the system 10 has a programmable logic controller 80 adapted to control operation of controllable components of the system.

Figure 3:
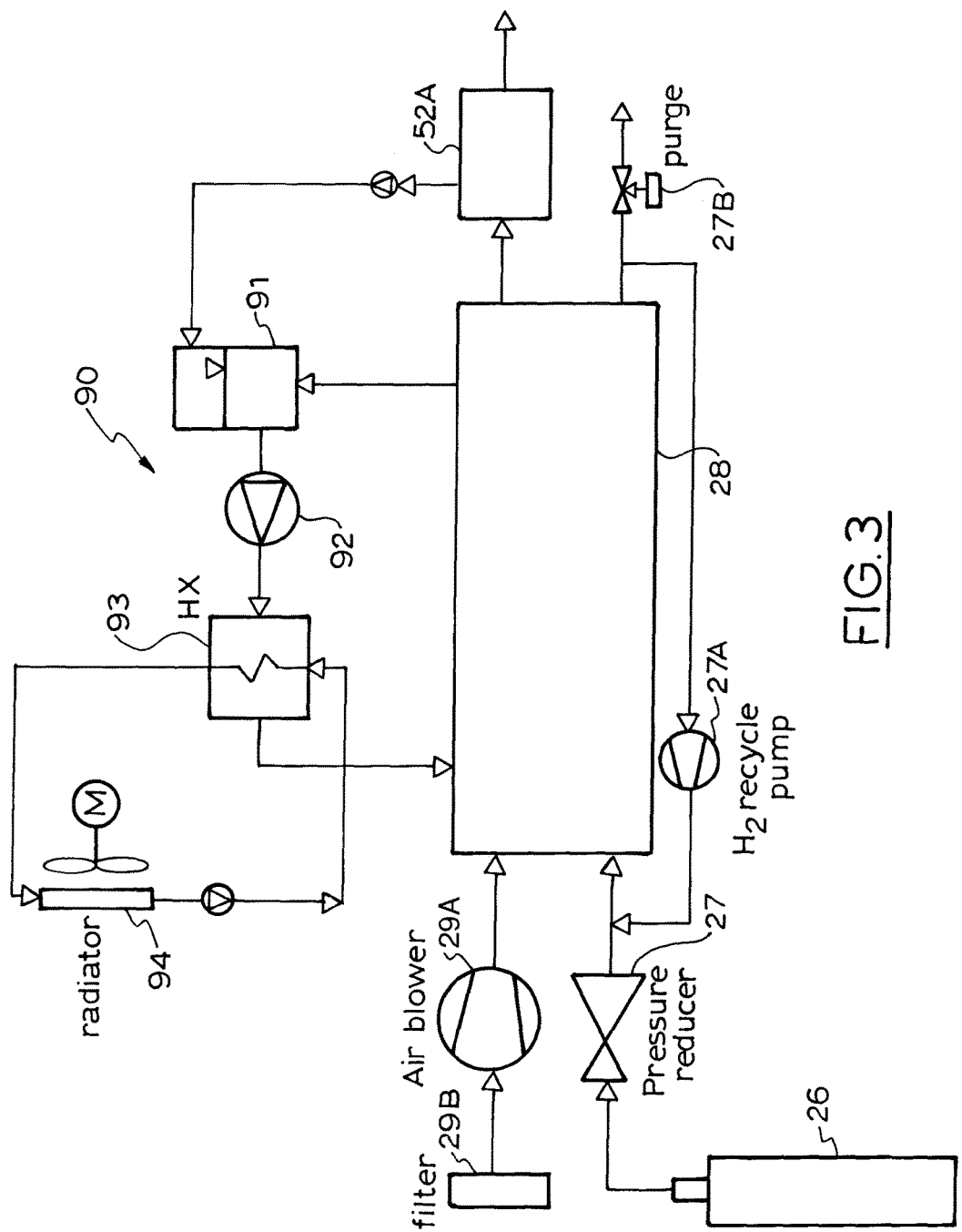
FIG. 3 is a schematic flow diagram showing details of operation of the fuel cell assembly.

FIG. 3 shows a sixty cell stack fuel cell assembly 28 which receives hydrogen from a hydrogen storage tank 26. A pressure reducer 27 reduces the pressure of the hydrogen from the tank 26 before reaching the assembly 28. Hydrogen passing through the assembly 28 may be returned by a recycle pump 27A or purged through a valve 27B.

An air blower 29A draws air through a filter 29B into the assembly 28. Water formed during the electrochemical reaction between hydrogen and oxygen in the assembly 28 is passed through a condenser 52A of the HVAC 52 as described above and a part of the water is fed into a humidifier 90 comprising a spray tower 91, a pump 92, a heat exchanger 93 and radiator 94. The water is fed to the spray tower 91 where it humidifies return air from the assembly 28. The pump 92 forces the humidified air to give up certain heat at the heat exchanger 93 before returning to the assembly 28. A flowable heat transfer medium receives heat at the exchanger 93 and releases the heat via the radiator 94.

For safe operating environment, the fuel cell assembly 28 must operate within safe operation parameters. The controller 80 or a dedicated controller (not shown) is adapted to configure and control operation of the assembly 28. Typically, the procedure for operating the assembly involves:

Start Up
1. Start cooling circuit;
2. Start heater in cooling circuit;
3. Start flushing cathode with air;
4. Start flushing anode with nitrogen;

Control
coolant flow rate <200 kg/h—increase flow rate;
coolant heating rate >20 k/min—slow heating rate;
$N_2$ flow rate in anode <32 Nl/min—increase flow rate;
air flow rate in cathode <65 Ml/min—decrease flow rate;
stack temp >65° c.—switch off coolant heater;
stack temp <60° c.—switch on coolant heater, When
stack temp >60° c. and)
$N_2$ flush time >20 min and) initiate operating mode
air flush time >10 min)

Operating Mode
1. Switch to OCV (i.e. idle operation on $H_2$);
2. Set load point;
3. Start $H_2$ and air flow;
4. Set load to stack;

Control
in coolant temp <62.5° c.—slow cooling down;
out coolant temp >67.5° c.—increase cooling rate;
pressure difference. over mea >300 m Bar—Initiate shutdown;
$H_2$ and air stoichometric ratios out of balance—adjust;
cell voltage >9.8V—decrease $H_2$ and air stoic mix;
cell voltage <0.55V—increase $H_2$ and air@stoic. mix;
cell voltage <0.3V over 5 sec—alarm;
cell voltage <specified minimum—initiate shut down;

Shut Down
1. switch to OCV;
2. close $H_2$ supply valve;
3. switch off air flow;
4. purge anode with $H_2$ for 10 min;
5. shut down cooling circuit.

Whilst the above has been given by way of illustrative example of the present invention many variations and modifications thereto will be apparent to those skilled in the art without departing from the broad ambit and scope of the invention as herein set forth in the following claims.

The invention claimed is:

1. A renewable energy power generation system supplying AC power to appliances and air conditioning to an associated space, comprising:
at least one renewable energy power generating apparatus that generates electric power;
a hydrogen power generation module having a separation unit that separates water into hydrogen and oxygen;
a fuel cell unit that receives air or oxygen, and hydrogen from said separation unit or from a hydrogen storage; the fuel cell unit being arranged to produce electric power in the presence of hydrogen and oxygen; and
a conversion means comprising an inverter that converts DC output from the renewable energy power generating apparatus and the fuel cell unit to AC power,
wherein the hydrogen power generation module receives electric power from the at least one renewable energy power generating apparatus at least prior to production of electric power by the fuel cell unit, electric appliances and an air conditioner are connected to the system such that the system supplies the AC power to the appliances and the air conditioner, said fuel cell unit supplying heat to the air conditioner for exchanging heat with a working fluid of the air conditioner, the air conditioner including a heat exchanger where heat from the fuel cell unit is transferred to the working fluid of the air conditioner, and a controller controls operation of the system.

2. The renewable energy power generation system according to claim 1, wherein said fuel cell unit produces water at an elevated temperature, wherein the water from the fuel cell is conveyed to the air conditioner.

3. The renewable energy power generation system according to claim 1, having a water purification module and further having a water tank holding relatively pure water from the water purification module and water generated by the fuel cell unit, and there being a mineralizer adding appropriate minerals to water from the water tank to make potable mineralized water.

4. The renewable energy power generation system according to claim 1, wherein said fuel cell unit produces water at an elevated temperature and the water from the fuel cell unit is conveyed to the air conditioner, and the system further comprises at least two renewable energy power generating apparatuses producing different DC output voltages, a DC to DC converter, the DC to DC converter receiving the output voltages and the converter providing a stabilized DC output, the stabilized DC output supplying power to the conversion means and to the separation unit and fuel cell unit.

5. The renewable energy power generation system according to claim 1 wherein the system further comprises at least two renewable energy power generating apparatuses producing different DC output voltages, a DC to DC converter, the DC to DC converter receiving the output voltages and the converter providing a stabilized DC output, the stabilized DC output supplying power to the conversion means.

* * * * *